Oct. 19, 1965 P. F. GUIENNE ETAL 3,212,700
EJECTOR DEVICES HAVING SLOT-LIKE INDUCING NOZZLES, ESPECIALLY FOR SUSTENTATION
Filed Jan. 7, 1963 3 Sheets-Sheet 1
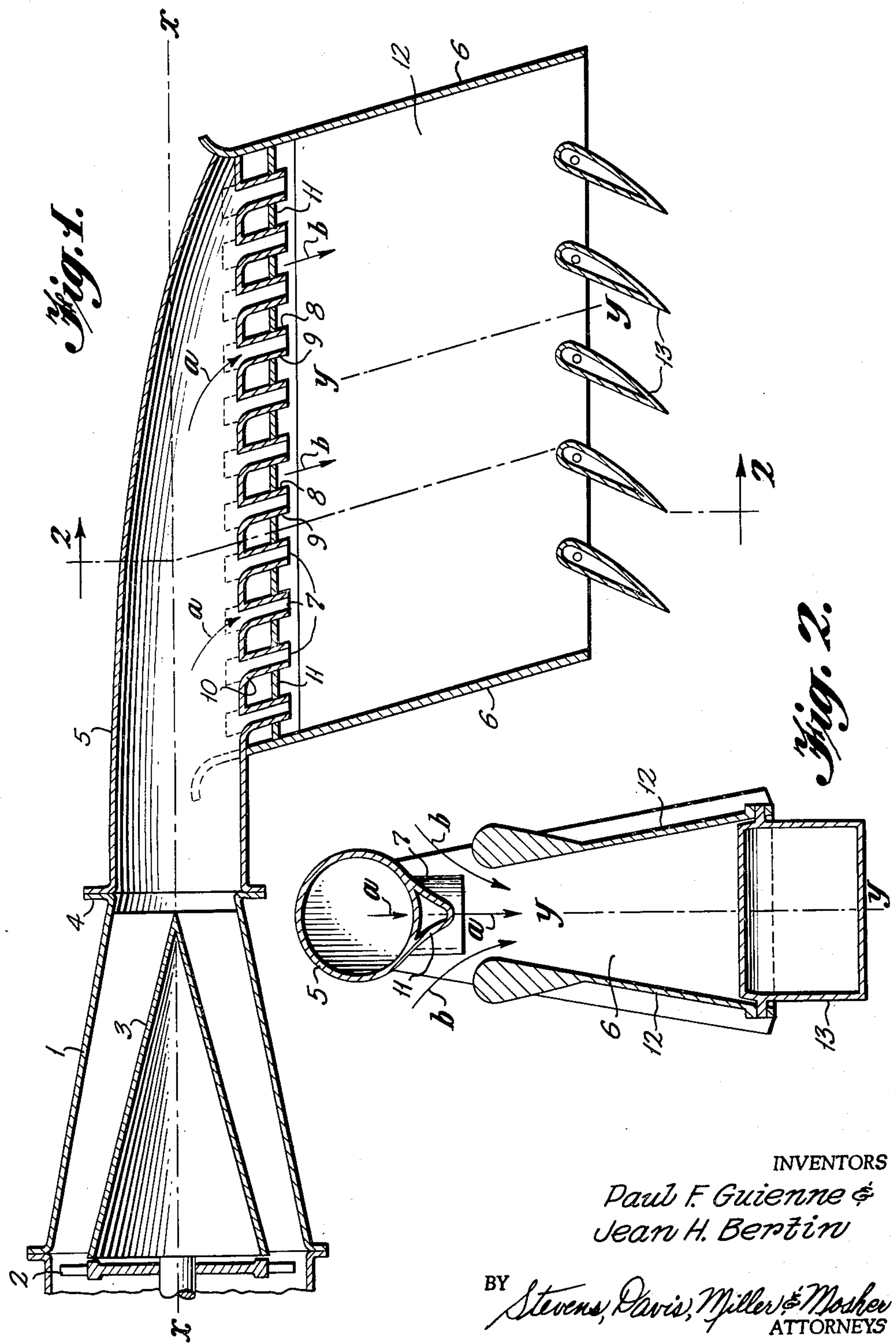
INVENTORS
Paul F. Guienne &
Jean H. Bertin
BY Stevens, Davis, Miller & Mosher
ATTORNEYS INVENTORS
Paul F. Guienne &
Jean H. Bertin BY Stevens, Davis, Miller & Mosher
ATTORNEYS Oct. 19, 1965 P. F. GUIENNE ETAL 3,212,700
EJECTOR DEVICES HAVING SLOT-LIKE INDUCING NOZZLES, ESPECIALLY FOR SUSTENTATION
Filed Jan. 7, 1963 3 Sheets-Sheet 3
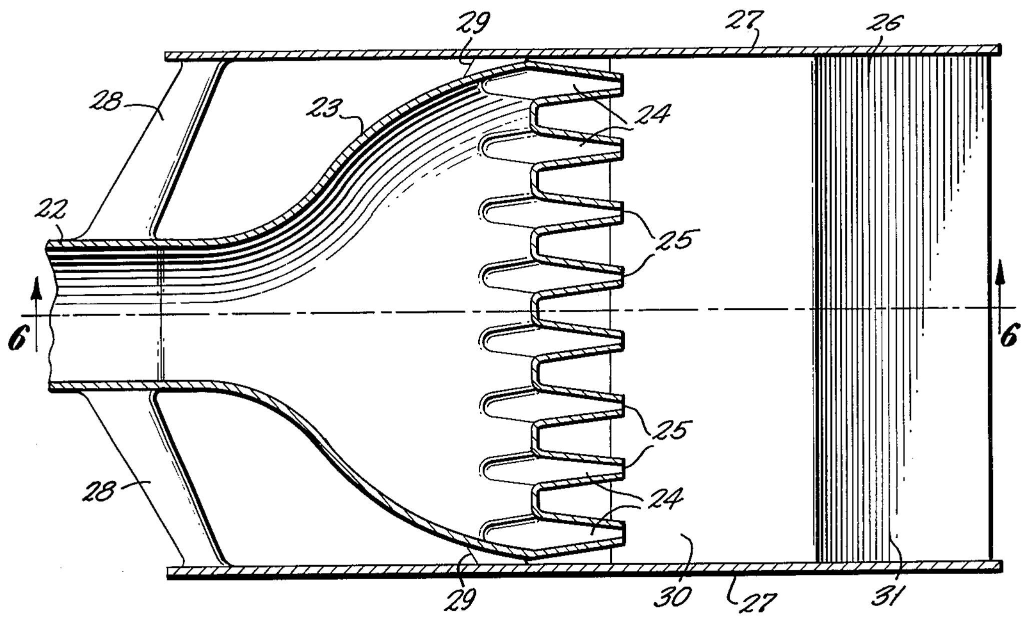
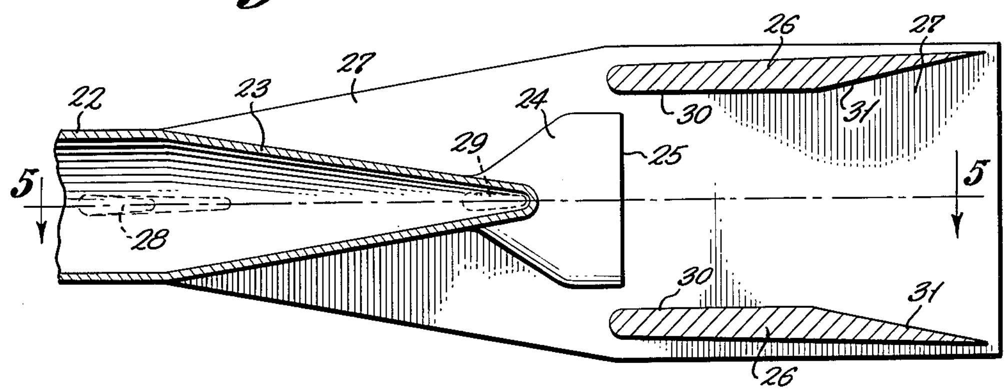
INVENTORS
Paul F. Guienne &
Jean H. Bertin
BY Stevens, Davis, Miller & Mosher
ATTORNEYS United States Patent Office 3,212,700

Patented Oct. 19, 1965

1

3,212,700

EJECTOR DEVICES HAVING SLOT-LIKE INDUCING NOZZLES, ESPECIALLY FOR SUSTENTATION

Paul François Guienne, Paris, and Jean Henri Bertin, Neuilly-sur-Seine, France, assignors to Bertin & Cie, Paris, France, a company of France

Filed Jan. 7, 1963, Ser. No. 249,753
Claims priority, application France, Jan. 12, 1962, 884,613
7 Claims. (Cl. 230—103)

This invention relates to a device for increasing the thrust of a jet of fluid and more particularly to an arrangement of nozzles for increasing the thrust of a turbo-jet engine suitable for lifting aircraft.

The invention provides a device for increasing the thrust of a jet of fluid comprising a diffuser of the two dimensions type and a plurality of inducing nozzles, in which the longest dimension of the transverse cross sections of the diffuser is substantially perpendicular to the longest dimension of the transverse cross section of the nozzles.

The invention will be more readily understood from the following description of one embodiment thereof, given by way of example only with reference to the accompanying drawings in which:

FIGURE 1 shows a jet pipe of a turbo-jet engine provided with a nozzle according to the invention of vertical section on the plane of symmetry.

FIGURE 2 is a cross section on the line II—II of FIGURE 1.

FIGURES 5 and 6 are sections on the lines V—V and VI—VI of one another on two planes of symmetry showiing a second modification wherein the axes of the diffuser and of the supply duct for the inducing jet coincide with each other.

Figure 3:
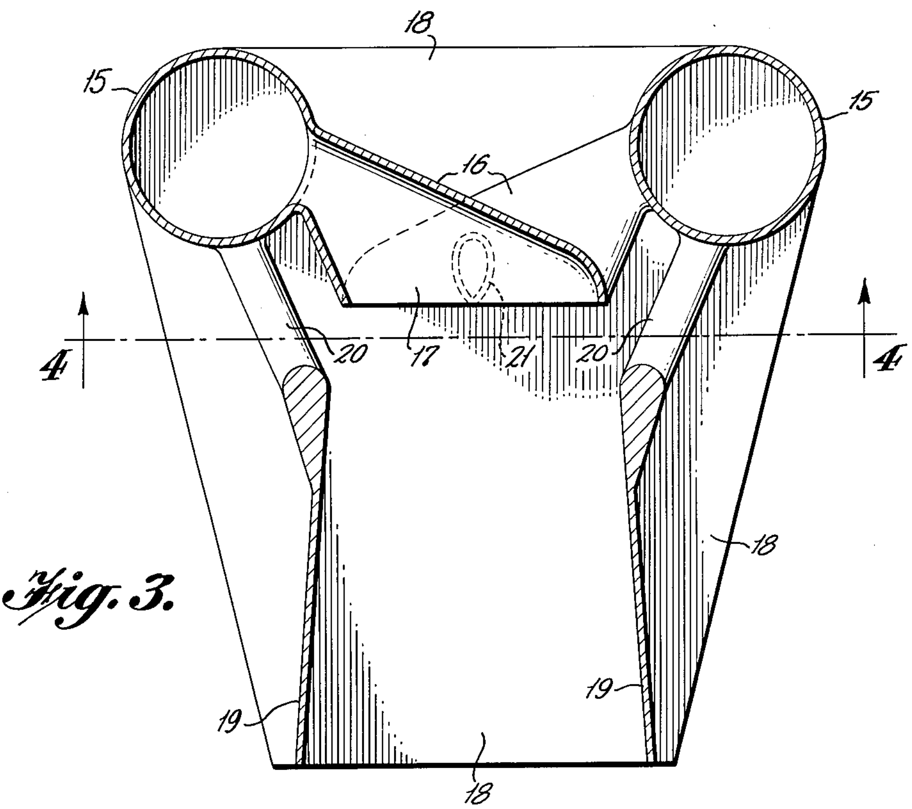
FIGURE 3 is a cross section showing a first modification comprising two supply conduits for the inducing jets.

Referring to FIGURE 1, it will be seen that the rear portion of a turbo-jet engine comprises an exhaust nozzle 1 which is made divergent by the provision of a central cone 3 down stream of the last stage 2 of a turbine.

The exhaust nozzle 1 is connected by a flange 4 to a jet pipe 5 of a progressively decreasing cross sectional area, which may support the various parts of the nozzle proper. The latter, which is shown in cross section in FIGURE 2, comprises a mixer diffuser of diverging cross-sectional area formed by two walls 12 with rounded upper edges. Plates 6 with turned up edges form the ends of the mixer-diffuser, the axis Y—Y of which includes with the axis X—X of the supply jet pipe 5 a considerable angle, which is chosen to suit those conditions of operation, which are most frequently encountered. Flaps 13 may be swung simultaneously about horizontal axes by a control means (not shown) to control the direction of the efflux from the mixer-diffuser, and to reduce the outlet area of the latter.

The multiple thin sheet inducing jets issue from nozzles 7 of elongated rectangular section arranged across the width of the mixer-diffuser. The walls 8 and 9 of the nozzle are parallel to the end walls 6, and the forward wall is connected by a bend 10, to the wall of the jet pipe 5 in such a manner as to utilize the initial velocity of the fluid forming the inducing jets in the best possible manner.

A cusped sheet metal piece 11 constitutes a spacer between the walls 8 and 9 of any two adjacent nozzles, and also serves to increase the rigidity of the assembly and to guide the induced airflow.

2

The functioning of such an ejector device is as follows: the hot gases issuing from the turbo-jet engine are passed by the jet pipe 5 to the various nozzles 7, and are distributed amongst them in accordance with the arrows *a*. The ambient air induced into the mixer-diffuser by the jets *a* follows the arrows *b*. The inducing jets form parallel sheets, and the divergence of the total flow in the diffuser is due to the angle included between the boundary walls 12. The swivelling of the flaps 13, allows the final orientation of the total flow issuing from the mixer-diffuser to be chosen in the vertical plane which is desirable in transitions from horizontal to vertical flight.

The nozzle walls 8, 9 which are short in themselves and may be formed readily in a light-weight construction reinforce the jet pipes 5 in the region of the openings. Likewise, the spacer 11 integrates the individual nozzles with one another and reduces their vibrations. The assembly may accordingly be carried out in a robust and yet light weight construction. Moreover the frontal area in a section plane corresponding to FIGURE 2 is very much reduced. Hence a particularly high aerodynamic efficiency is achieved for a given weight.

Figure 4:
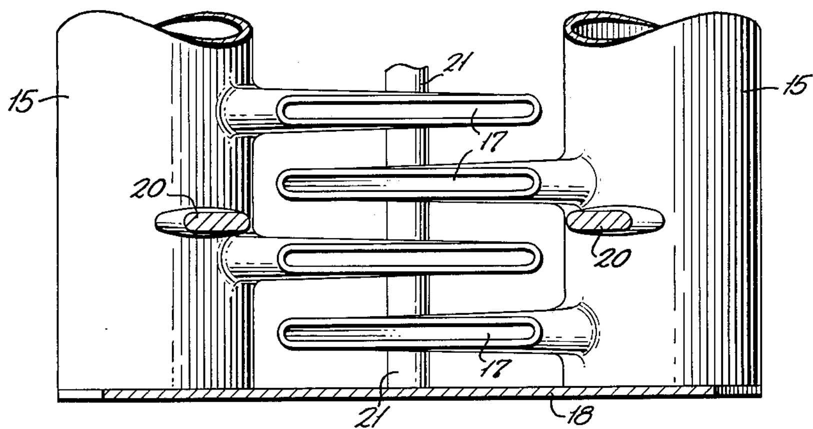
FIGURE 4 is a plan view from below partly in section on line IV—IV of FIGURE 3.

FIGURES 3 and 4 show, respectively, a cross-section and a plan view from below partly in section, of a first modification in which there are two supply jet pipes.

These jet pipes 15 support by means of profiled struts 20 the walls 19 of a mixer-diffuser, the sides of which are bounded by walls such as 18. The transverse ducts 16 lead into the jet pipes 15 and diverge so as to form nozzles 17 of greatly elongated profile. The ducts 16 which are supplied from these conduits alternately are integrated and combined by a profiled spacer 21.

FIGURES 5 and 6 illustrate a second modification according to which the axes of the supply jet pipe and of the mixer-diffuser coincide. FIGURE 5 is a section on the longitudinal plane of symmetry of the mixer-diffuser while FIGURE 6 is a transverse section thereof.

The jet pipe 22 flares out so as to form a fish tail 23 to which are joined ducts 24. The latter have their major dimensions perpendicular to that of the fish tail and diverge so as to form the nozzles 25 of greatly elongated profile.

These nozzles are arranged across the width of a mixer-diffuser, which may be supported by the supply means of the inducing jet formed by the jet pipe 22, the fish tail 23 and the ducts 24. This mixer-diffuser is formed from end plates 27 and walls 26 the inner faces of said walls being in their upstream portion 30, substantially parallel to the plane of symmetry V—V so as to form the mixer proper, and are inclined to the said plane of symmetry in their downstream portion 31, so as to form the diffuser proper of divergent section. It may be supported by means of profiled struts such as 28 and 29.

These two modifications differ from the embodiment according to the FIGURES 1 and 2 particularly in the position relative to one another of the mixer-diffuser and of the supply jet pipe of the inducing jet, however, they offer similar structural advantages.

The major advantage of the invention is a high efficiency which is due to the large contact area between the inducing jets, and the induced flow. This feature is associated with one of the so-called fluid veil nozzles as described for example in our patent specification No. 2,922,277. The transverse arrangement of the injecting nozzles in the form of thin sheets, makes it particularly easy to construct the nozzles resistant and yet light in weight and with a small frontal area, whereby the nozzles having a remarkably high efficiency for their weight so that they are particularly useful for lifting aircraft.

What is claimed is:

1. An ejector device comprising, in combination, a diffuser duct of elongated cross-section with a relatively large length and a relatively small breadth and extending longitudinally between an intake end and a discharge end thereof, said intake end being bounded by rounded wall edges and being open to the ambient atmosphere along the lengthwise direction, a multiplicity of elongated, narrow, substantially parallel slot-like nozzles positioned close to and upstream of said intake end and opening toward said diffuser duct in a generally longitudinal direction with respect thereto, to form, when supplied with motive gas under pressure, a plurality of thin, sheet-like jets projecting into said diffuser duct to induce thereinto ambient fluid over said rounded edges and through said intake end, said slot-like nozzles extending breadthwise of said diffuser duct and being mutually spaced lengthwise thereof, and a motive gas supply manifold carrying said slot-like nozzles and communicating therewith to supply motive gas thereto.

2. An ejector device according to claim 1, wherein said diffuser duct is of substantially rectangular cross-section and is bounded by two opposite end plates substantially parallel to said slot-like nozzles and two opposite side walls substantially perpendicular to said end plates, each of said side walls being shaped at said intake end to form said rounded wall edges.

3. An ejector device according to claim 2, wherein said side walls respectively comprise upstream and downstream portions, said upstream wall portions defining an upstream diffuser portion of constant transverse section for mixing of the motive gas and of the ambient fluid induced, prior to diffusion thereof.

4. An ejector device according to claim 1, wherein said motive gas supply manifold is in the form of a pipe extending in a direction substantially perpendicular to said slot-like nozzles, with the axis of said pipe inclined at a substantial angle with respect to that of said diffuser duct.

5. An ejector device according to claim 1, wherein said motive gas supply manifold is in the form of a pipe extending in a direction substantially parallel to said slot-like nozzles and having a fish-tail downstream portion in communication with said nozzles.

6. An ejector device according to claim 1, comprising further a multiplicity of rigid spacer elements interconnecting the adjacent sides of successive slot-like nozzles to stiffen the same, said spacer elements being of streamlined shape.

7. An ejector device according to claim 1, comprising two said motive gas manifolds substantially parallel to each other and spaced apart from each other, each of said manifolds carrying a respective group of said nozzles in the space between said manifolds.

References Cited by the Examiner

UNITED STATES PATENTS

| | | | |
|---|---|---|---|
| 1,375,601 | 4/21 | Morize. | |
| 2,305,765 | 12/42 | Franz. | |
| 2,503,172 | 4/50 | Pullin. | |
| 3,045,947 | 7/62 | Bertin et al. | 244—12 |
| 3,085,770 | 4/63 | Sutton | 244—23 |
| 3,100,377 | 8/63 | Kosin et al. | 60—35.54 |
| 3,109,581 | 11/63 | Wikstrom | 230—95 X |

FOREIGN PATENTS

| | | |
|---|---|---|
| 997,262 | 9/51 | France. |
| 744,196 | 2/56 | Great Britain. |
| 886,201 | 1/62 | Great Britain. |

MARK NEWMAN, *Primary Examiner.*

SAMUEL LEVINE, *Examiner.*